(12) United States Patent
Mou et al.

(10) Patent No.: US 6,690,395 B2
(45) Date of Patent: Feb. 10, 2004

(54) PROGRESSIVELY ROLLING ANIMATION DISPLAY METHOD ON CELLULAR PHONES

(75) Inventors: Michael Mou, Taipei (TW); Yuting Shih, Taipei (TW)

(73) Assignee: Dbtel Incorporated, Tu-Cheng (TW)

( * ) Notice: Subject to any disclaimer, the term of this patent is extended or adjusted under 35 U.S.C. 154(b) by 239 days.

(21) Appl. No.: 09/887,350

(22) Filed: Jun. 25, 2001

(65) Prior Publication Data

US 2002/0196266 A1 Dec. 26, 2002

(51) Int. Cl.[7] .................................................. G04G 5/00
(52) U.S. Cl. ........................ 345/763; 345/810; 345/798; 345/977; 345/684; 345/473; 455/566
(58) Field of Search ................................. 345/810, 684, 345/687, 688, 473, 763, 835, 828, 798, 830, 977; 340/7.56

(56) References Cited

U.S. PATENT DOCUMENTS 5,565,888 A * 10/1996 Selker ......................... 345/823
5,742,779 A * 4/1998 Steele et al. ................. 345/839
6,359,615 B1 * 3/2002 Singh ........................... 345/173

FOREIGN PATENT DOCUMENTS

EP      1028570    *  8/2000    ........... H04M/1/00

* cited by examiner

Primary Examiner—Matthew C. Bella
Assistant Examiner—Antonio Caschera
(74) Attorney, Agent, or Firm—Leong C. Lei (57) ABSTRACT

A progressively rolling display method of animation graphics on a cellular phone which offers a much more dynamic and interesting way of displaying the contents of a cellular phone, and in particular to one having a selection pending area presented by means of a large graphic animation provided in the center of the display on the cellular phone and accompanied to its right and left by multiple icons indicating previous and next options, so that when a user is browsing and selecting options from a List of Main Functions, the icon is in progressive rolling sequence and enters either from right to left or left to right into the central area to become an option pending selection to exit and then the existing option is reduced and quits the central area and becomes an icon of a previous option.

1 Claim, 8 Drawing Sheets

- Function without SIM Took Kit (STK) by system provider (setup in SIM Card):

Fig.030

- Function with SIM Took Kit (STK) by system provider (setup in SIM Card):

- Function with SIM Took Kit (STK) by system provider (setup in SIM Card):

FIG. 16

PROGRESSIVELY ROLLING ANIMATION DISPLAY METHOD ON CELLULAR PHONES

BACKGROUND OF THE INVENTION (a) Field of the Invention

The present invention relates to a method of progressively rolling animation display on a cellular phone, and more particularly, to one that offers a much more dynamic and interesting way display of options to operate the cellular phone.

(b) Description of the Prior Art

As it is limited by man-made interface, the display on a cellular phone generally available on the market is usually dull and lacking in variation. In addition, production of patterns for the display is also confined by the size, type and driver (e.g. maximal monitor resolution and number of colors) of LCD used by the cellular phone. Therefore, graphics have to be modified as the LCD changes. As a result, the Palette function which is available in a Windows operation system can only be dot produced manually page by page, and incapable of producing graphics as desired. Manually produced graphics are prevented from being inspected by the Palette of the Windows operation system to find out whether said graphics relates to continuous animation without the use of other graphic browsers, such as ACDSee, or FLASH. Graphics produced from Palette are also prevented from being converted into the definition as required. To acquire the text definition, it is necessary to write conversion programs separately according to the size, type and driver of the LCD used in the cellular phone.

SUMMARY OF THE INVENTION

The primary purpose of the present invention is to provide a method of progressively rolling animation display on a cellular phone. In the center of the monitor on the cellular phone, a graphic area of options displaying a large animation is provided. Small icons are respectively displayed at the right side and the left side of that large animation. Said small icons progressively enter on the screen one by one into the center of the monitor to become an option to offer a much more dynamic and interesting of display for the cellular phone.

To achieve the purpose of progressively rolling animation, graphics are plotted by pixel depending on the size of the LCD used by the cellular phone. Dot matrix are plotted page by page using Palette of Windows operation system in units of pixels, B/W colors and are stored in BMP format. Then stored graphics are converted using a standard format used by the cellular phone and displayed in rolling animation page by page in the LCD of the cellular phone using a clipboard technique.

DETAILED DESCRIPTION OF THE PREFERRED EMBODIMENTS

Figure 1:
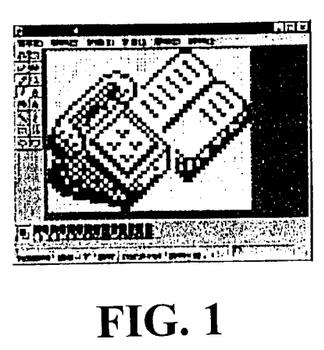
FIGS. 1 through 7 are schematic views showing a production flow of the present invention.
Figure 2:
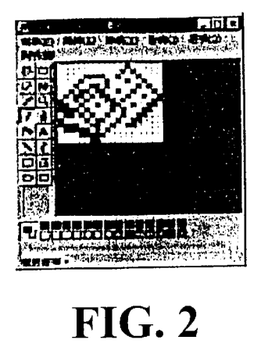
Figure 3:
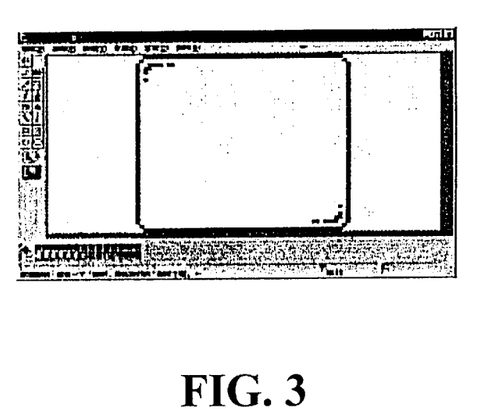
Figure 4:
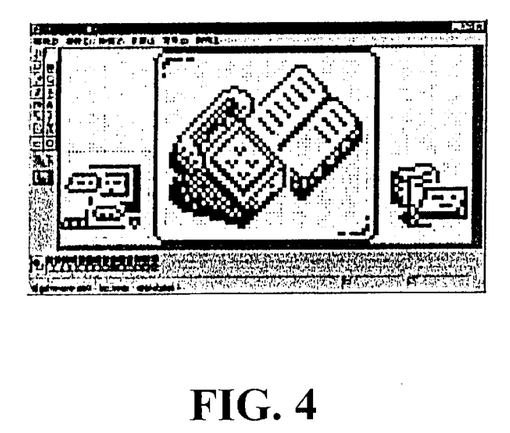
Figure 5:
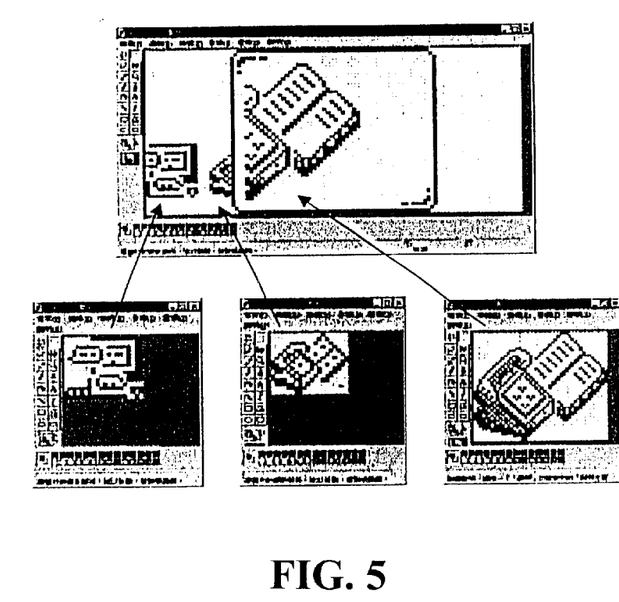
Figure 6:
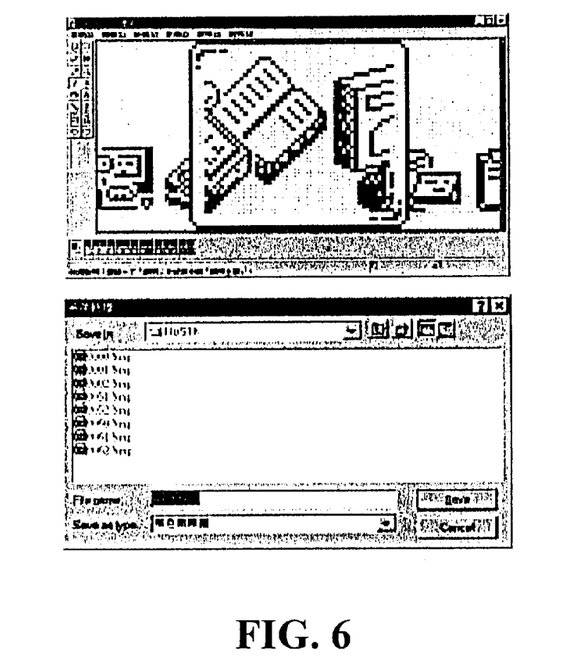
Figure 7:
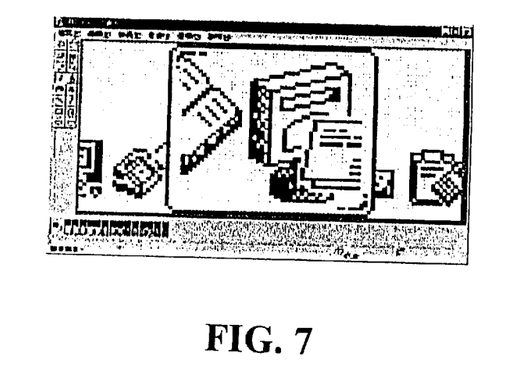
Figure 8:
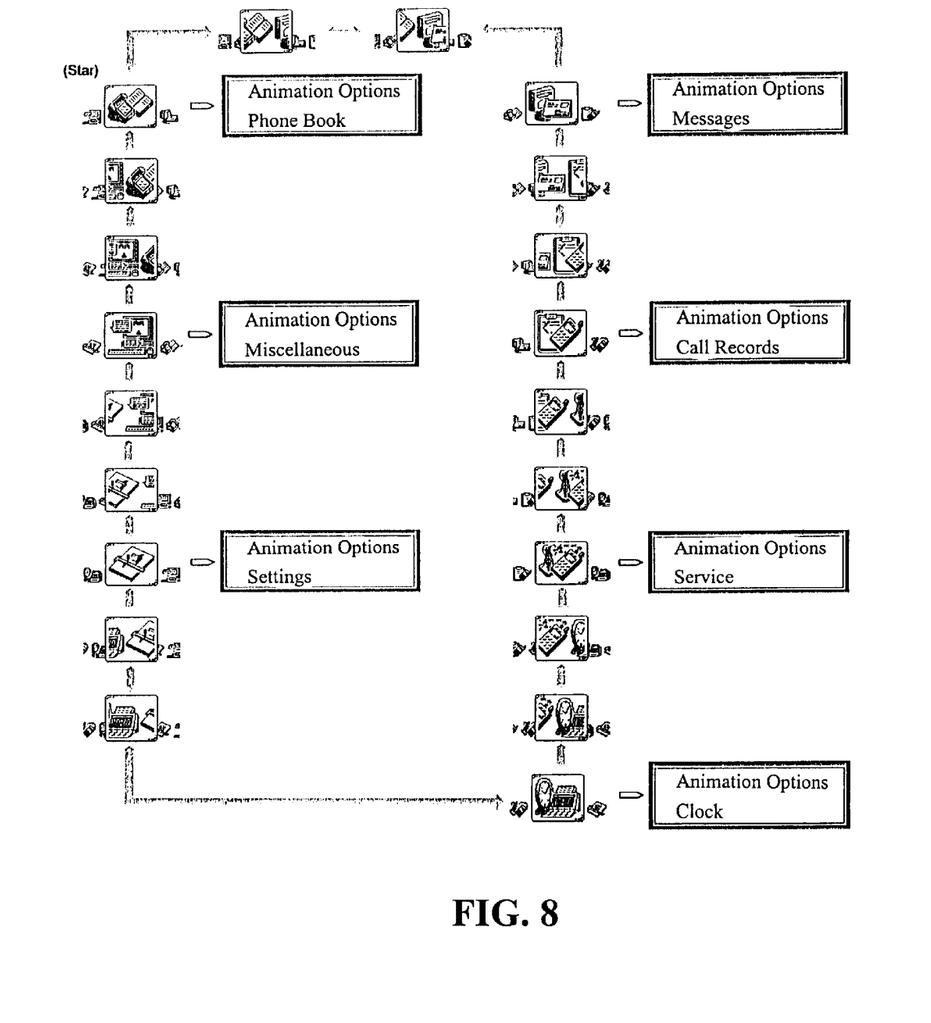
FIG. 8 is a schematic view showing a rolling sequence of the present invention.

Referring to FIGS. 1 through 7, the graphics production process disclosed in the present invention includes the following steps:

1. Basic graphics and associated small icons are plotted as illustrated in FIGS. 1 and 2.
2. The background is plotted based on resolution of a LCD used by a cellular phone as illustrated in FIG. 3.
3. Depending on the list of main functions defined, each basic graphic and its associated previous and next small icons are placed in the center of the monitor on the cellular phone and into the background as illustrated in FIG. 4 and stored in BMP format.
4. The number of pixels to be displaced in the progressive rolling for each type of graphics (including the basic and small icons) in the background (FIG. 3) counted before placing the graphics captured into the background as illustrated in FIG. 5.
5. The graphics are stored in BMP format as illustrated in FIG. 6.
6. Steps 1 through 4 are repeated to complete the rest of the graphics pending displacement as illustrated in FIG. 7.
7. Steps 3 through 5 are repeated to complete all the graphics required as illustrated in FIG. 8.
8. Depending on the file name of the text definition, the graphics are named in hexadecimal 4-digit by following the sequence.
9. Conversion programs of hexadecimal text definition file available in BMP graphic file are used to convert them into that of the text definition file used by the cellular phone. (Note that said conversion programs must be separately developed and placed under the same directory of the graphic file in BMP format to be converted).
10. The conversion programs are directly run by clicking the mouse to select options in the directory. Said programs are executed in the MS-DOS mode window of the Windows operation system.
11. Upon completing the format conversion, the MS-DOS mode window is automatically closed and files PDEXH and IX.H are created under the same directory.
12. A graphic definition file containing man-machine interface source code (led by head file: ICON.H) is opened. Then the text of each graphic in PI.H file is copied to its corresponding item in the ICON.H file.
13. Upon completing the copy of all graphic text definitions, the re-stored ICON.H file and a compiling of all source codes is run to translate program codes into the firmware programs of the cellular phone.
14. Upon completing the compilation, the firmware programs are downloaded to the cellular phone.

Figure 9:
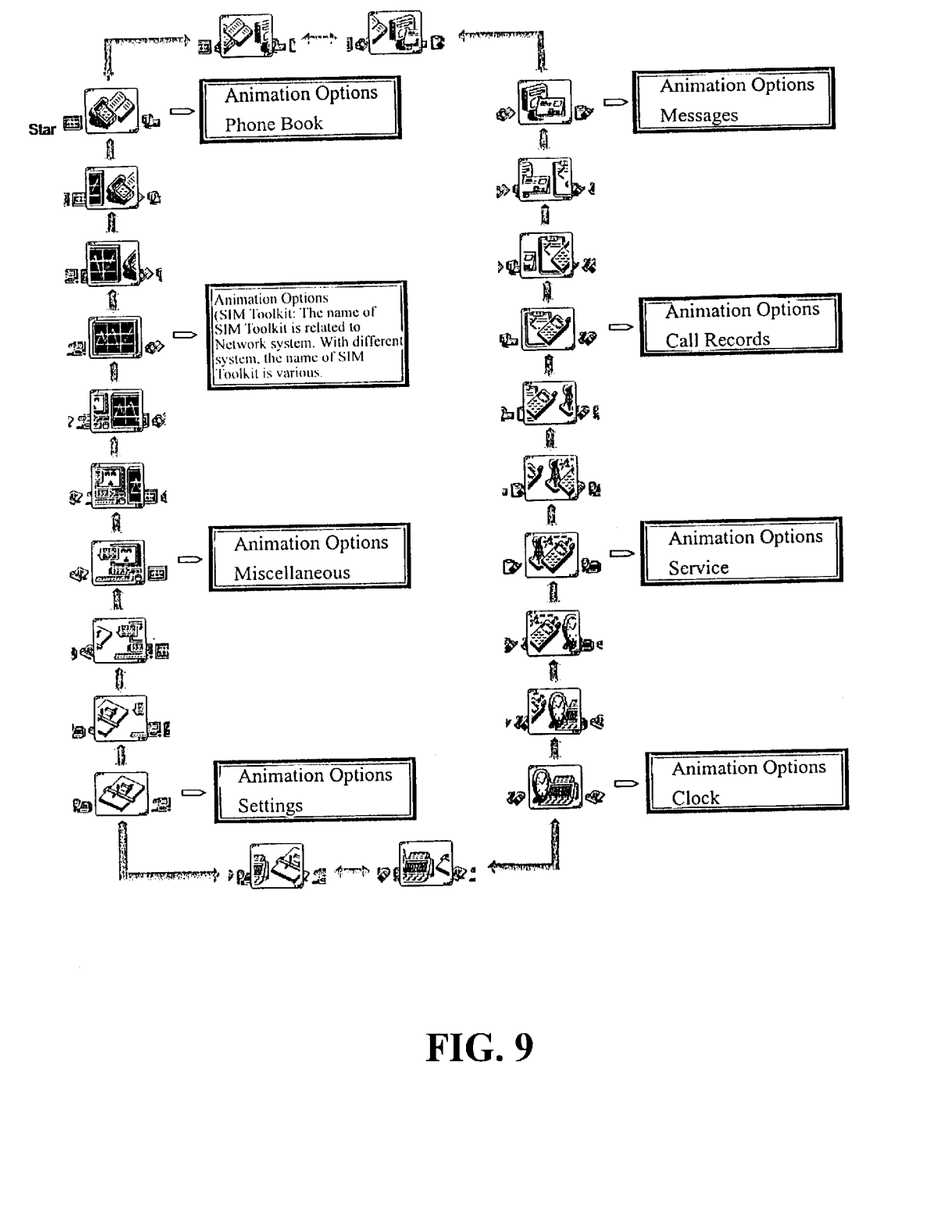
FIG. 9 is a schematic view showing the function of the SIM Tool Kit of the present invention.
Figure 10:
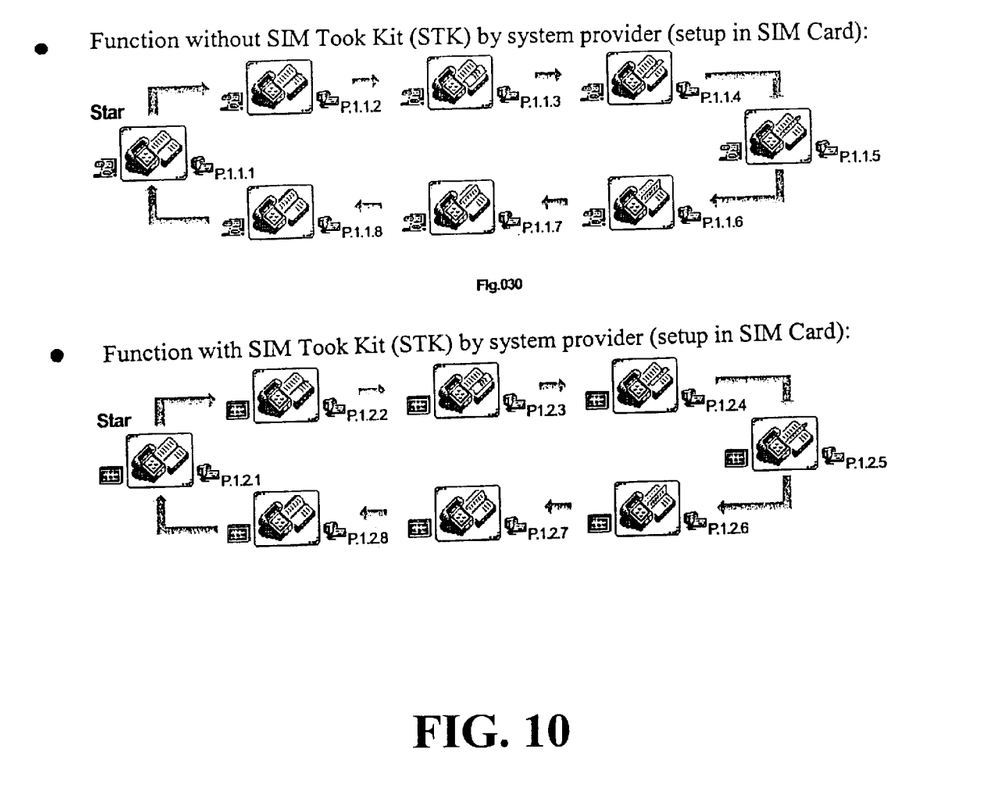
FIG. 10 is a schematic view showing an operation of the Phone Book function of the present invention.

FIGS. 9 and 10 show a preferred embodiment of the present invention,
wherein the rolling sequence is illustrated depending on whether the SIM Tool Kit function is made available by the network system provider.

Figure 11:
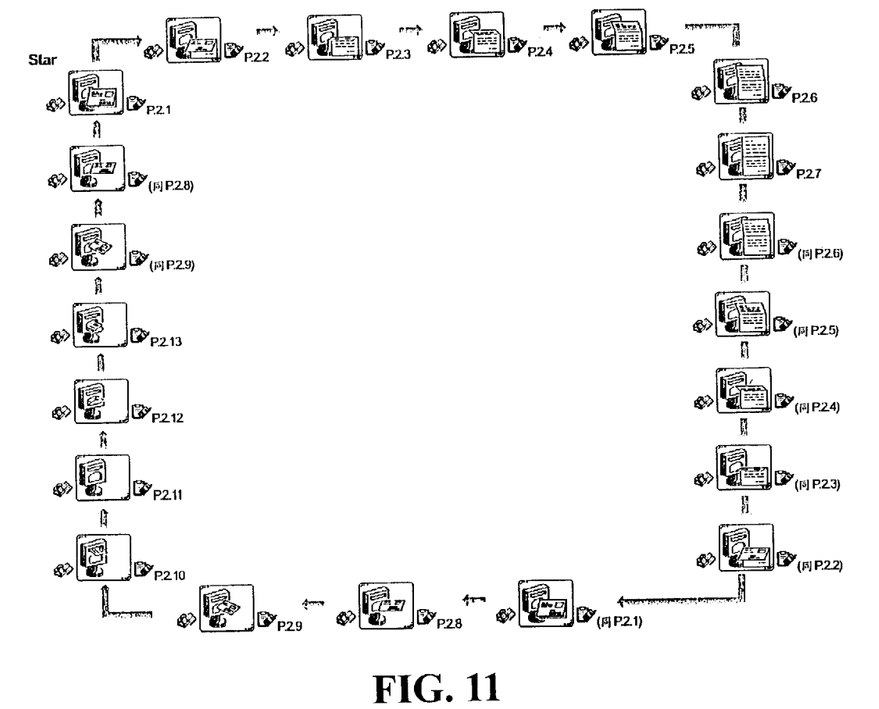
FIG. 11 is a schematic view showing an operation of the Message function of the present invention.
Figure 12:
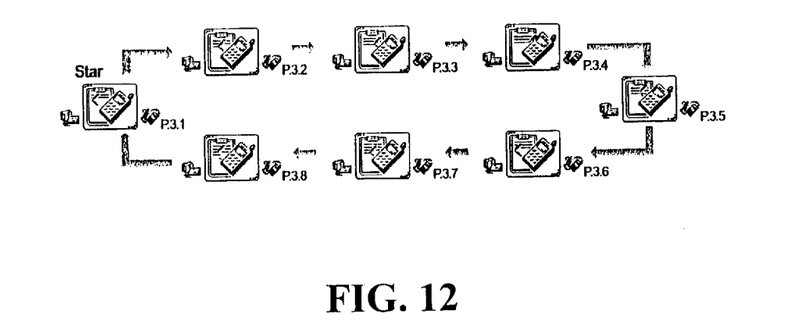
FIG. 12 is a schematic view showing an operation of the Call Records function of the present invention.
Figure 13:
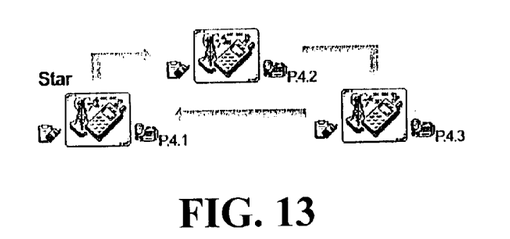
FIG. 13 is a schematic view showing an operation of the Services function of the present invention.
Figure 14:
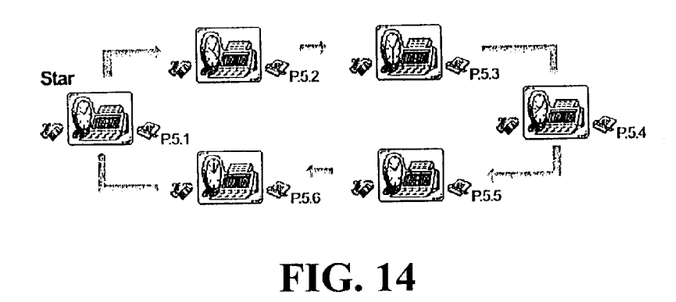
FIG. 14 is a schematic view showing an operation of the Clock function of the present invention.
Figure 15:
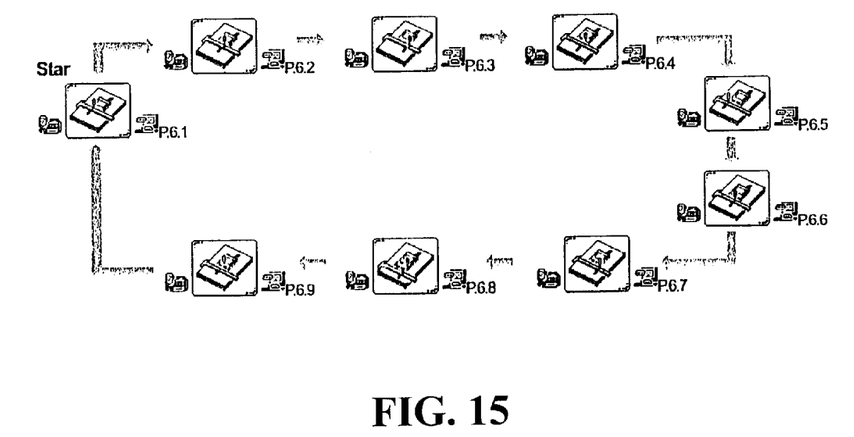
FIG. 15 is a schematic view showing an operation of the Settings function of the present invention.
Figure 16:
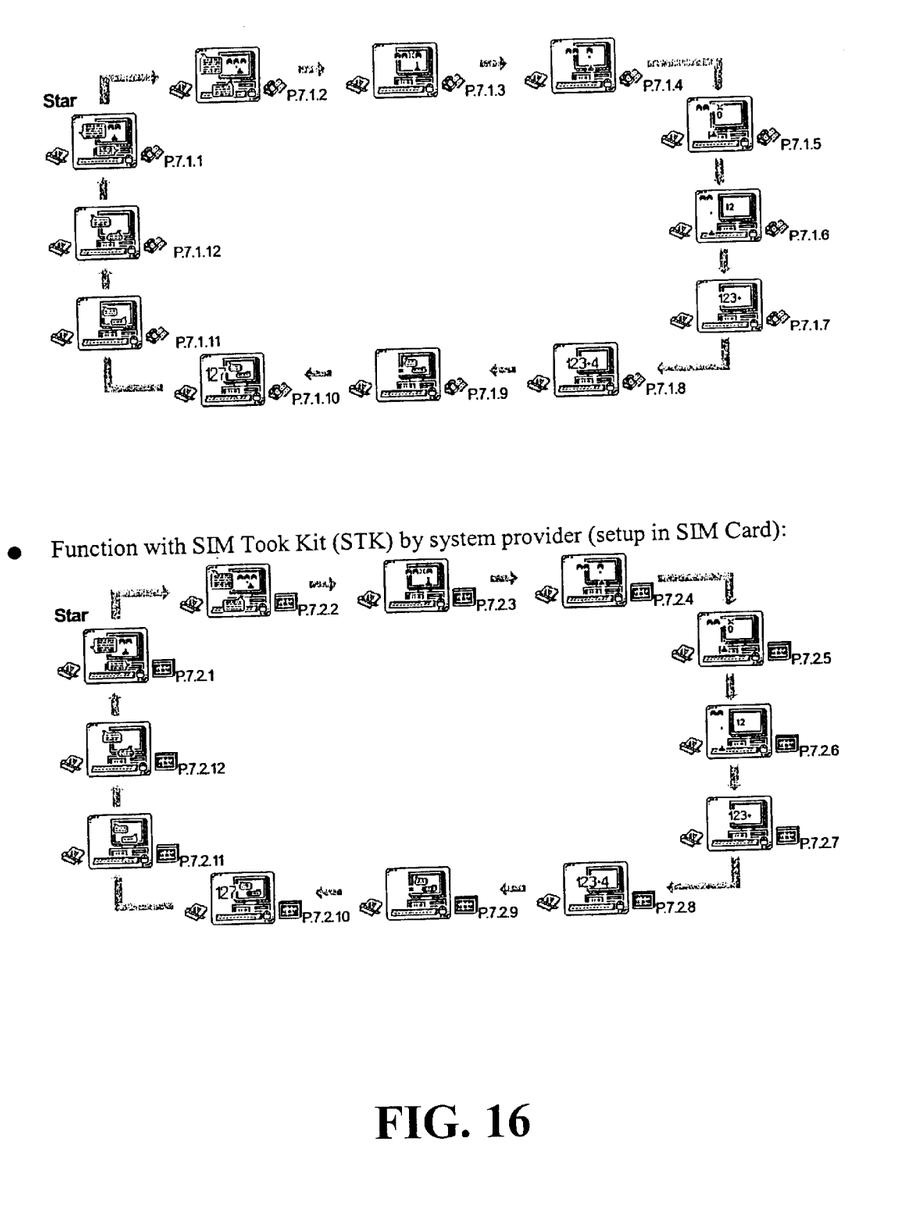
FIG. 16 is a schematic view showing an operation of the Miscellaneous function of the present invention.

FIG. 11 for a schematic view of the Phone Book options display of the present invention.

FIGS. 12 through 17 respectively show a preferred embodiment of the present invention for the progressively rolling display of Message, Call Records, Services, Clock, Settings and Miscellaneous functions.

I claim:

1. A progressively rolling display method of animation graphics on a cellular phone which offers a dynamic and interesting way of displaying the contents of a cellular phone, and has a selection pending area presented by means of a large graphic animation provided in a center of a display on the cellular phone and accompanied to right and left thereof by multiple icons indicating previous and next options, so that when a user is browsing and selecting options from a list of main functions, the icons are in progressive rolling sequence and enter either from right to left or left to right into a central area to become an option pending selection to exit and then an existing option is reduced and quits the central area and becomes an icon of a previous option; wherein production process of the icons comprising steps of:

a. plotting basic graphics and associated icons by compromising a background plotted depending on resolution of an LCD on the cellular phone;

b. placing icons representing previous and next options plotted according to the basic graphics put into background and stored in BMP formal based on the list of main functions as defined;

c. counting number of pixels to be displaced in course of progressively rolling display for each icon and saving in BMP formal;

d. converting BMP hexadecimal graphic file using text definition conversion programs into a text definition format used by the cellular phone;

e. opening a man-machine interface source graphic file to copy text definitions of each graphic to corresponding items in ICON.H file;

f. completing copying of all text definitions, saving the ICON.H file, and running all source codes of the cellular phone to translate the source codes into firmware programs of the cellular phone; and g. downloading the firmware programs to the cellular phone.

\* \* \* \* \*